(12) United States Patent
Beldring et al.

(10) Patent No.: US 8,318,014 B2
(45) Date of Patent: Nov. 27, 2012

(54) REACTOR COMPRISING A STACK OF FILTER PLATES

(75) Inventors: Finn Beldring, Virum (DK); Christian Rasmussen, Tjele (DK)

(73) Assignee: Grundfos Management a/s, Bjerringbro (DK)

( * ) Notice: Subject to any disclaimer, the term of this patent is extended or adjusted under 35 U.S.C. 154(b) by 429 days.

(21) Appl. No.: 12/300,274

(22) PCT Filed: May 2, 2007

(86) PCT No.: PCT/EP2007/003847
§ 371 (c)(1), (2), (4) Date: Dec. 2, 2008

(87) PCT Pub. No.: WO2007/128467
PCT Pub. Date: Nov. 15, 2007

(65) Prior Publication Data
US 2009/0159514 A1  Jun. 25, 2009

(30) Foreign Application Priority Data
May 10, 2006 (EP) .................................... 06009606

(51) Int. Cl.
*B01D 33/00* (2006.01)
(52) U.S. Cl. .................. 210/335; 210/359; 210/326
(58) Field of Classification Search ............. 210/330, 210/323.2, 326, 97, 107, 335, 359; 435/297.1, 435/295.3, 295.1
See application file for complete search history.

(56) References Cited

U.S. PATENT DOCUMENTS

| | | | |
|---|---|---|---|
| 5,098,571 A | 3/1992 | Maebashi | |
| 5,275,725 A | 1/1994 | Ishii et al. | |
| 5,326,512 A | 7/1994 | Stillwagon et al. | |
| 5,665,231 A * | 9/1997 | Langsdorf et al. | 210/314 |
| 5,707,517 A * | 1/1998 | Rolchigo et al. | 210/232 |
| 5,855,799 A | 1/1999 | Herrmann | |
| 5,989,437 A * | 11/1999 | Eriksson et al. | 210/744 |
| 6,733,662 B2 * | 5/2004 | Pollock | 210/97 |
| 6,805,806 B2 * | 10/2004 | Arnaud | 210/788 |
| 7,112,310 B2 | 9/2006 | Menke | |
| 2003/0150822 A1 * | 8/2003 | Schliebmann et al. | 210/784 |
| 2004/0232070 A1 * | 11/2004 | Jensen et al. | 210/619 |
| 2005/0029183 A1 | 2/2005 | Sternad et al. | |
| 2007/0158260 A1 * | 7/2007 | Mauer | 210/331 |
| 2008/0006572 A1 | 1/2008 | Rasmussen et al. | |

FOREIGN PATENT DOCUMENTS

| | | |
|---|---|---|
| DE | 19624176 A1 | 1/1998 |
| DE | 202 10 294 U1 | 11/2002 |
| EP | 0 222 937 A1 | 5/1987 |
| EP | 0723799 A1 | 7/1996 |
| EP | 1 260 485 A1 | 11/2002 |

(Continued)

*Primary Examiner* — Yelena G Gakh
*Assistant Examiner* — Christopher A Hixson
(74) *Attorney, Agent, or Firm* — Panitch Schwarze Belisario & Nadel LLP

(57) ABSTRACT

A reactor includes a tubular-shaped housing in which a stack of filter plates can be rotationally arranged. The cross-sectional area of the reactor container is, in the region of the stack of filter plates, a maximum of 40% greater than the cross-sectional area of the stack of filter plates. The longitudinal extension of the reactor housing is a multiple of the longitudinal extension of the stack of filter plates, such that inside the reactor, adjacent to the stack of filter plates, additional processing devices can be arranged. The rotating stack of filter plates ensures that the entire reactor is cross-flown in an intensive manner.

17 Claims, 7 Drawing Sheets

FOREIGN PATENT DOCUMENTS

| | | |
|---|---|---|
| EP | 1616621 A1 | 1/2006 |
| FR | 2 799 391 | 4/2001 |
| JP | 61-274799 A | 12/1986 |
| WO | 98/03245 | 1/1998 |
| WO | 01/56937 A1 | 8/2001 |
| WO | 02/094721 A1 | 11/2002 |
| WO | 03/039712 A1 | 5/2003 |

* cited by examiner

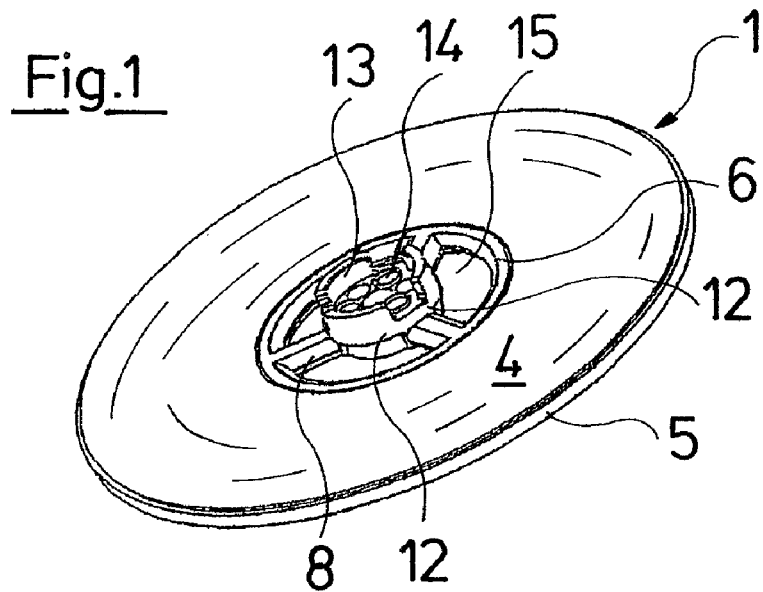
Fig.1
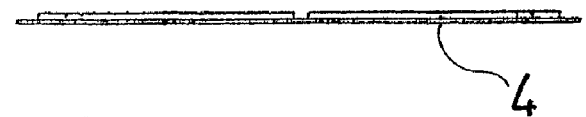
Fig.2
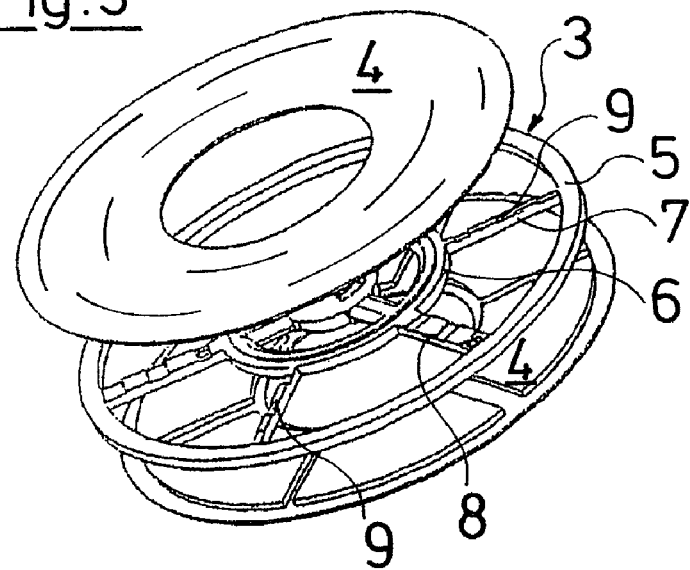
Fig.3

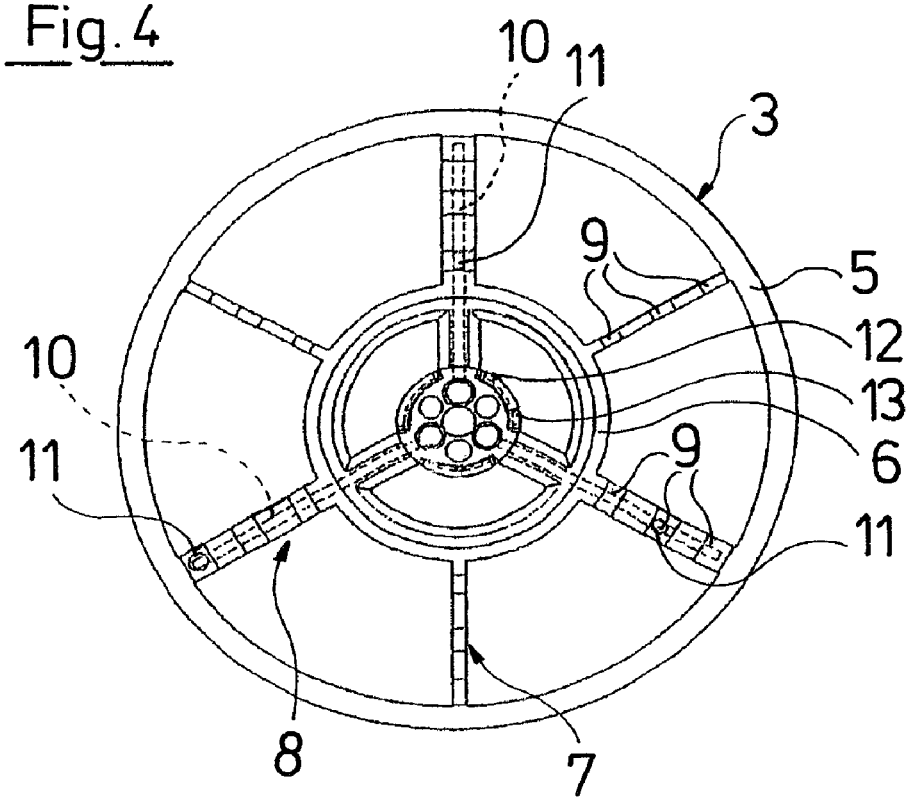
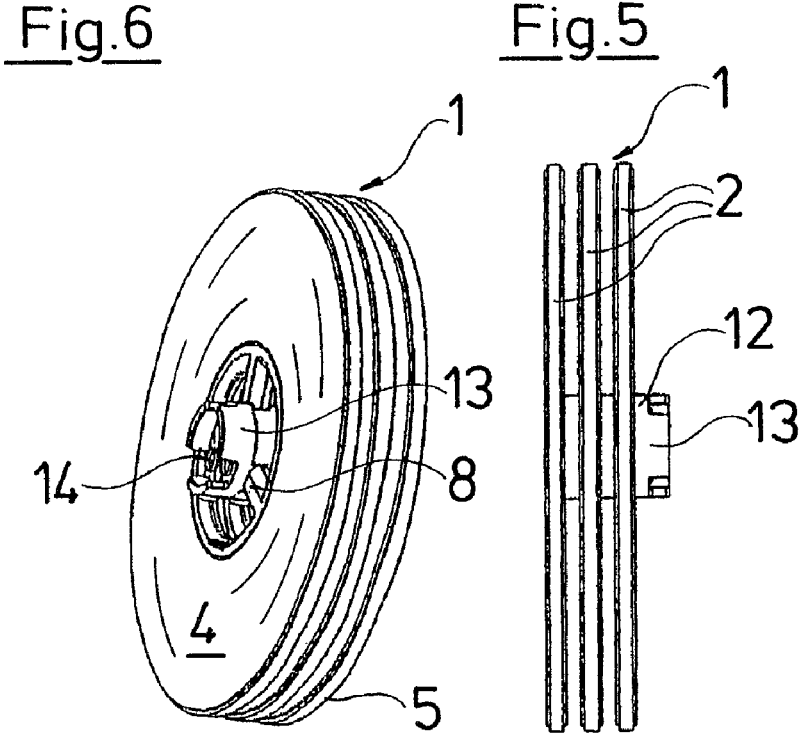

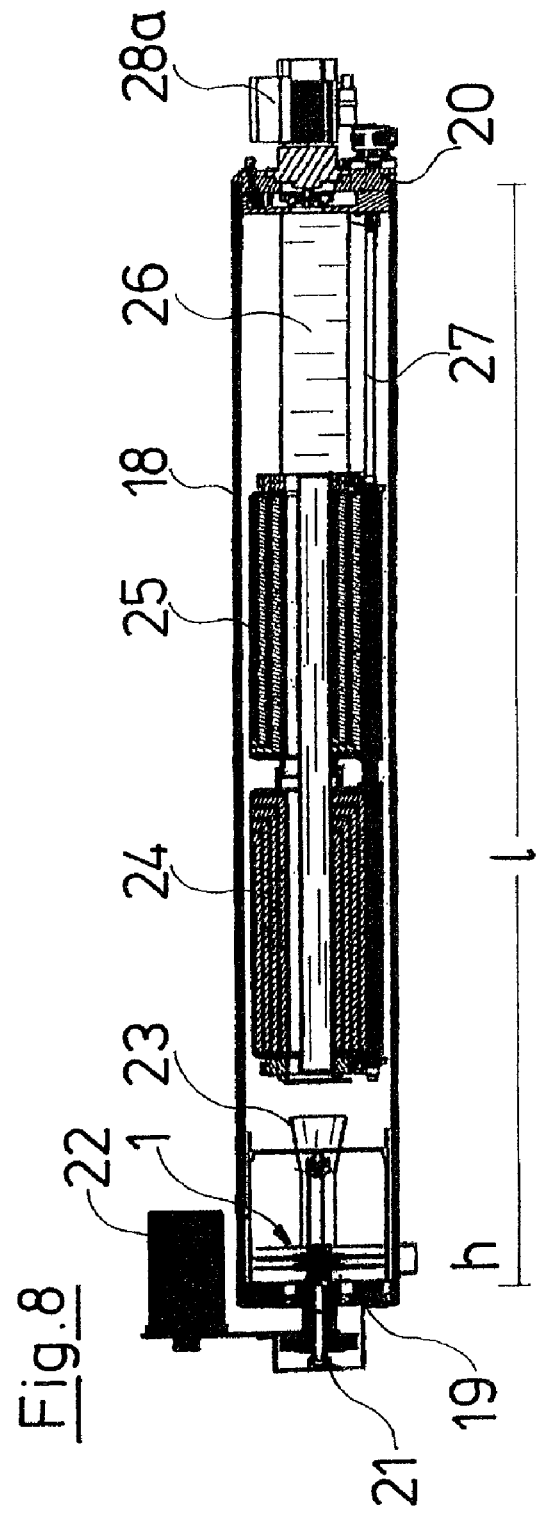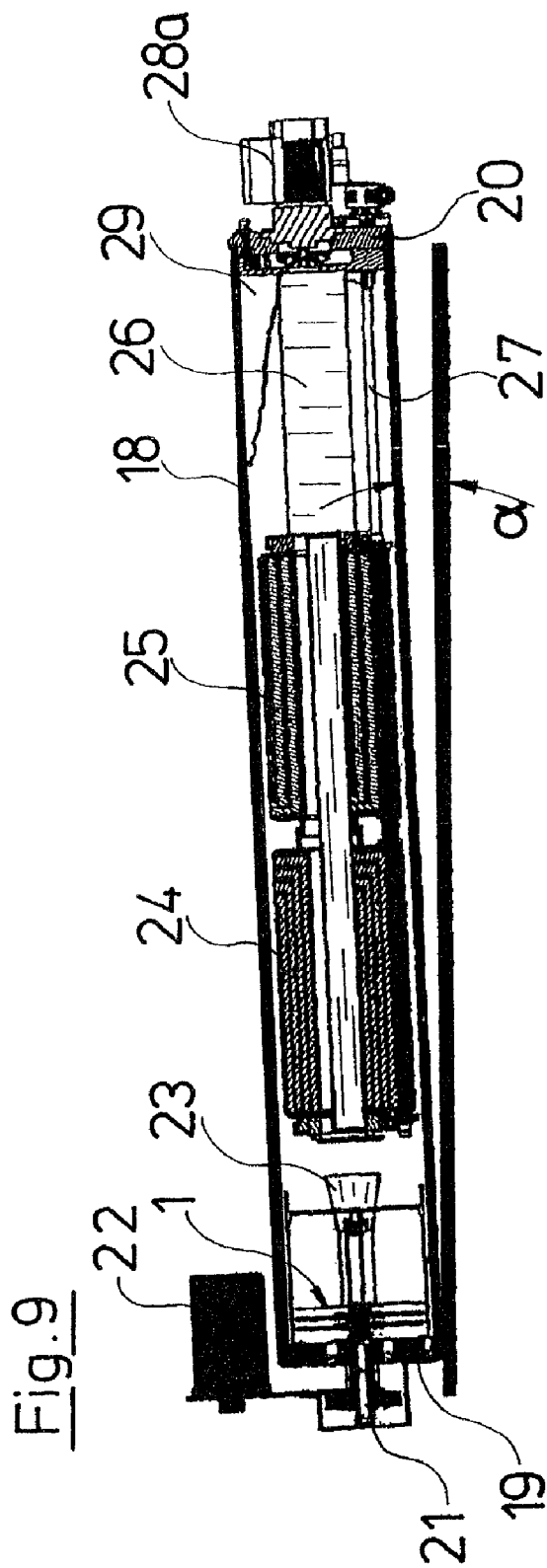

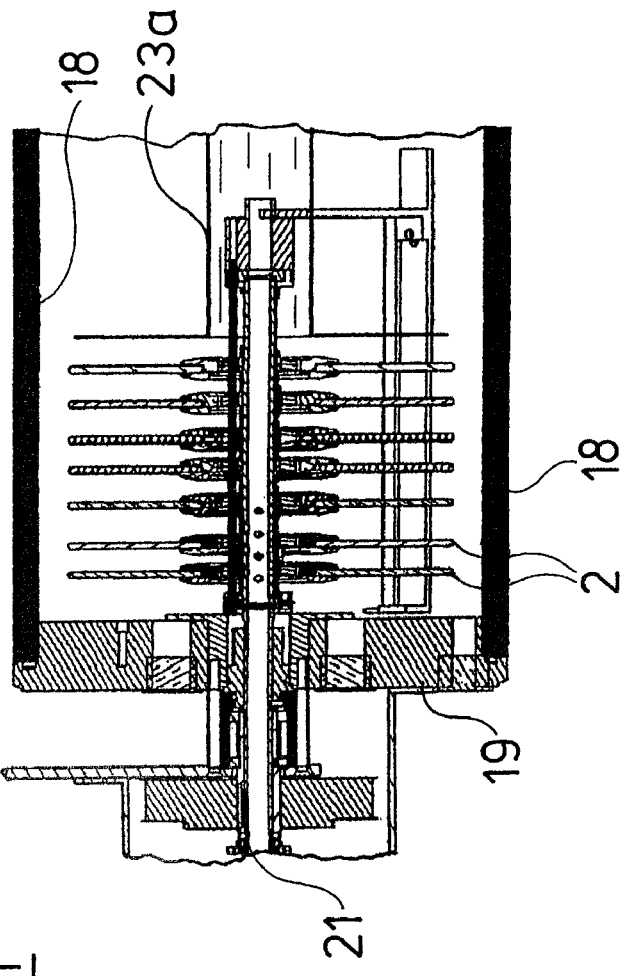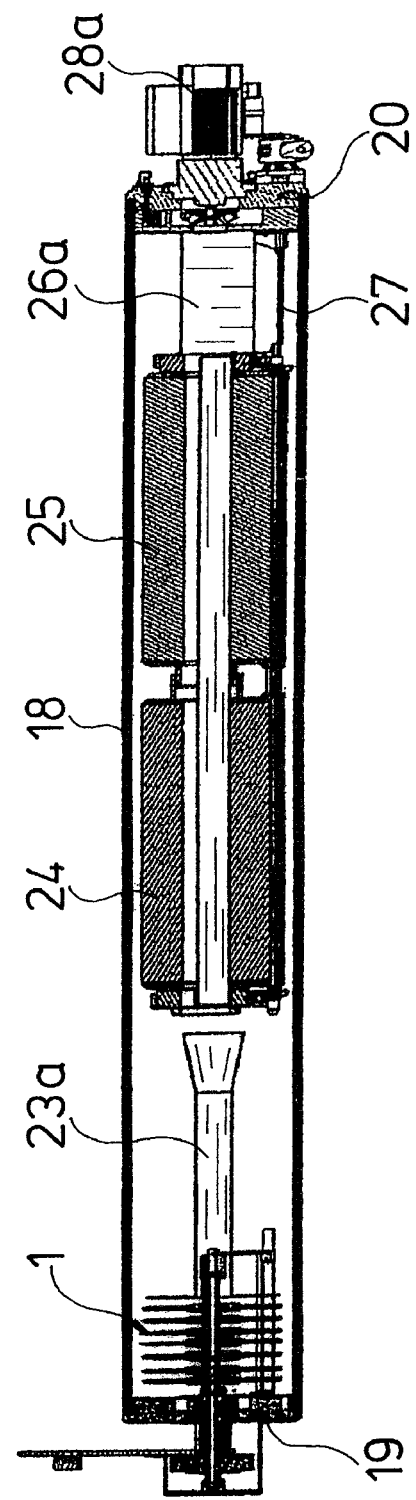

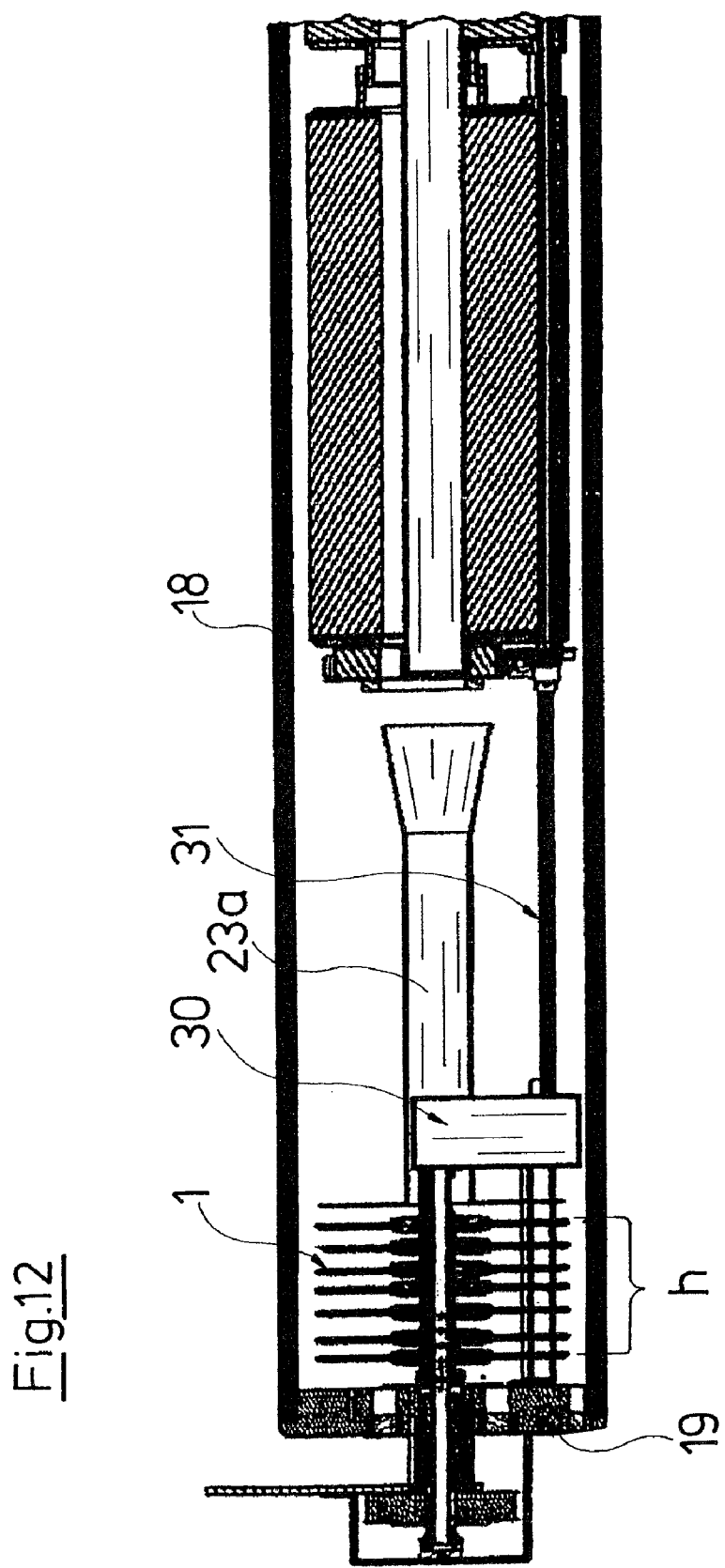

REACTOR COMPRISING A STACK OF FILTER PLATES

CROSS-REFERENCE TO RELATED APPLICATIONS

This application is a Section 371 of International Application No. PCT/EP2007/003847, filed May 2, 2007, which was published in the German language on Nov. 15, 2007, under International Publication No. WO 2007/1218467 A1 and the disclosure of which is incorporated herein by reference.

BACKGROUND OF THE INVENTION

The invention relates to a reactor for treating fluids, in particular for water treatment.

The treatment of waste water may be effected mechanically, e.g., by way of filters, biologically, chemically, or physically as well as with a combination of these mentioned methods. With biological fluid treatment, it is counted as belonging to the state of the art to apply so-called reactors in which the fluid to be treated is led to a large, biologically active surface. Such a reactor is known, for example, from International Publication No. WO 02/094721 A1. The reactor described there comprises two plate stacks which mesh with one another, one of which is rotatingly driven, in order to continuously remove the biologically active coating growing on the plates of the individual stacks, with the fluid flowing through. With this known reactor, a comparatively high pump power is required, in order to not only convey the fluid to be treated through the reactor, but also to ensure an adequate discharge of the constantly occurring biologically active coating. The reactor known from European Patent Application Publication No. EP 1 616 621 A1 is more favorable inasmuch as this is concerned, in which the plates are completely and regularly cleaned by way of stripper elements. However, here, the fluid circulation within the reactor is inadequate if one does not deliver it through the reactor with a sufficiently high pump power.

With regard to the mechanical fluid treatment by way of filters, filter devices which are formed of stacks of hollow filter plates, which as the case may be, are also driven in rotation in an essentially cylindrical filter housing, are counted as belonging to the state of the art. The fluid to be filtered is introduced into the housing, goes through the filters formed in the region of the surface of the filter plates, into the inside of the plates and from there, into a central channel via which the filtered fluid is withdrawn. Such filter plates are known for example from German Patent Application Publication DE 196 24 176 A1 or European Patent No. EP 0 723 799, and corresponding filter devices are known from German Patent Application Publication No. DE 196 24 176 A1 as well as from U.S. Pat. No. 5,326,512. It is, moreover, known from German Patent Application Publication DE 196 24 176 A1 to profile the filter plates on their surfaces in a manner such that with a rotation of the filter plate stack, a certain radial flow effect is produced, which is to ensure a fluid exchange on the filter surface, in particular for the removal of residues on the filter surface.

BRIEF SUMMARY OF THE INVENTION

It is the object of the present invention to improve the fluid circulation in a reactor, as much as possible, without the application of additional pump power.

The reactor according to the invention comprises a tubular housing, in which a filter plate stack is rotatably arranged. The cross-sectional area of the reactor container thereby is dimensioned such that it exceeds the cross-sectional area of the filter plate stack at the most by 40%, at least in the region of the filter plate stack, and the longitudinal extension of the reactor housing is a multiple of the longitudinal extension of the filter plate stack.

The reactor according to the invention, apart from the filter plate stack which effects a mechanical fluid treatment by way of mechanical filtering, typically comprises further fluid treatment means, wherein the previously mentioned cross-sectional dimensioning between the reactor container and the filter plate stack ensures that a certain pump effect arises on rotation of the filter plate stack, which ensures a circulation of the fluid within the reactor. Thereby, according to the invention, the longitudinal extension is selected such that apart from the filter treatment, further fluid treatments within the reactor may be effected, typically biological treatments, wherein the pump effect of the filter plate stack is used in order to also subject the remaining part of the reactor to throughflow.

A particularly intensive flow through the reactor results if the rotation axis of the filter plate stack and the axis of the reactor housing are arranged parallel to one another, since then a flow through the reactor is formed in the axis direction. Thereby, it may be advantageous if the axes are not aligned to one another, i.e., the rotation axis of the filter plate stack is arranged out-of-centre with respect to the axis of the reactor housing.

According to a further formation of the invention, the filter plate stack is advantageously attached in the end region of the reactor housing, wherein the drive for the rotation of the filter plate stack is usefully led through the end-side of the reactor housing and is arranged outside the housing. The arrangement of the drive outside the housing is particularly favorable, since it is not to be encapsulated with respect to the surroundings, is easily accessible and is inexpensive to attach. Moreover, in particular, the lead-through and attachment on the end-side of the reactor housing makes particular sense, since, then, the typically cylindrical housing does not need to undergo any special mechanical machining.

Usefully, but not necessarily, further fluid treatment devices are provided within the reactor housing, which are advantageously arranged such that they are run through one after the other according to their arrangement in the reactor. Thus, a largely complete fluid treatment may take place within the reactor, wherein different treatment methods, in particular biological and mechanical ones, are applied. The delivery flow which is required for the transport of the fluid within the reactor is thereby advantageously built up by the pump effect of the rotating filter plate stack, or is at least supported by this.

A particularly advantageous combination of treatment methods results, if, according to a further formation of the invention, at least one or, as the case may be, several biofilm reactors are arranged within the reactor housing, and specifically preferably at the end of the reactor, which is distant to the filter plate stack. Since biofilm reactors, as are known, for example, from the initially mentioned state of the art, require a drive for the rotation of the plate stacks which mesh with one another. This arrangement is particularly favorable, since the drive which is required may be led through at the other end-side of the reactor and attached on the outer side, so that the drive for the filter plate stack as well as the drive for the biofilm reactor are provided in a freely accessible manner on the end-sides, so that the cylindrical housing part does not need to be specially adapted for this.

According to a further formation of the invention, the drive for the biofilm reactor may be effected via the drive of the filter unit, advantageously by way of a mechanical coupling between the filter plate stack and the rotatable part of the biofilm reactor. One may completely make do without a separate drive for the biofilm reactor by way of this, i.e., a mechanical drive is only to be provided on one side of the reactor, which is simple and inexpensive with regard to design, and which furthermore creates free space at the other end, for the attachment of other assemblies.

The arrangement of the drives and, as the case may be, of further required assembly parts or conduit lead-throughs at the end-sides, is particularly useful, since then the reactor housing may be formed by an essentially unmachined cylindrical tube or one which is oval in cross section, which may be formed inexpensively of plastic, preferably using an extruded PVC-polyethylene tube or polypropylene tube with a diameter of more than 200 mm. It is to be understood that the housing may also be formed of other suitable materials, such as stainless steel, for example. Thereby, the previously described design consisting of a tube with two end-side covers is particularly favorable, since differently long housings, and thus reactors, may be manufactured, without having to carry out significant design changes, since only the length of the tubular part varies, and the end-side cover which is typically to be machined in a material-removing manner, may be applied in an unchanged manner. Usefully, the conduit connections for the fluid supply and discharge are likewise arranged at the end-side in the reactor housing, in order to be able to leave the tubular housing part unmachined as far as this is concerned.

The flow through the reactor housing may be yet encouraged by way of it being arranged in an inclined manner. Thereby, a slight oblique position in a manner such that the longitudinal axis of the reactor housing encloses an angle of preferably below 30° with the horizontal, has been found to be advantageous. Such an oblique position effects a targeted gas discharge to the upper, obliquely set end within the reactor, as well as a circulation which is caused by gravitation and which may support the pump effect of the filter plate stack. Thereby, a gas bubble in the upper region of the reactor is advantageous already for hydraulic reasons, since pressure peaks may be absorbed and damped by way of this, which otherwise could only be absorbed in a secure manner of complicated valve technology given a reactor which is completely filled with fluid.

In order to achieve an adequate pump effect of the filter plate stack, which goes beyond the state of the art, according to a further formation of the invention, it is envisaged to drive the filter plate stack at a peripheral speed of more than 3 m/s. Thereby, it is useful if the filter plates comprise a suction-port-like recess in the central region, via which the fluid is sucked and then is delivered radially/tangentially outwards. The withdrawal of the filtered fluid is thereby usefully effected in a manner known per se through a central channel of the filter plate stack, which advantageously lies within the part forming the drive shaft.

Apart from the previously described, hydraulic effect of a gas bubble within the reactor, this may, however, also be desired for reasons regarding fluid treatment. For this, according to a further formation of the invention, a filling level regulation is provided, which maintains the fluid filling level of the reactor to a predefined value, preferably between 50 and 99% of the reactor volume.

Moreover, a ventilation device may be provided in a targeted manner for the reactor, with which for example a gas flow or air flow is applied at a predefined location, which in particular with an oblique arrangement of the container, flows through this and remains in the upper region of the reactor or is led away there again. The ventilation device may, depending on the demands, be designed as a closed, partly open or open system. The gas supply may be effected through the filter plate stack itself, usefully through separate gas feed channels within the central channel which is provided for the filtrate discharge. Thereby, the discharge of the ventilation device is usefully effected through the filter plate stack itself, preferably through the filter surface, in the reverse through-flow direction to the fluid. A high surface effect is achieved with the flow of the gas through the filter fluid, and the gas feed, in particular the air feed, is finely distributed, i.e., is introduced into the reactor with a large surface, which intensifies its effectiveness. If the filter plate stack is not to be affected by the ventilation device with regard to its functioning, it is then useful to arrange the discharge of the ventilation device within the region of the reactor housing, which is distant to the filter plate stack.

The ventilation device advantageously comprises an internal circulation within the housing, so that an essentially closed system may be formed within the reactor.

In order to encourage the circulation within the reactor, it is advantageous to arrange a suction tube at the end of the filter plate stack, through which suction tube the fluid to be filtered is sucked within the reactor housing. Thereby, it has been shown to be advantageous not to arrange the suction opening directly on the filter plate stack, but at a distance to the filter plate stack, which corresponds at least to double the height of the filter plate stack.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 1 is a schematic top perspective view of a filter plate for a filter plate stack of a reactor according to the invention;

FIG. 2 is a schematic lateral view of the construction of the filter plate according to FIG. 1;

FIG. 3 is a schematic perspective exploded view of the construction of the filter plate according to FIG. 1;

FIG. 4 is a schematic plan view of the central component of the filter plate according to FIG. 1;

FIG. 5 is a schematic lateral view of three filter plates arranged into a stack;

FIG. 6 is a schematic perspective lateral view of the arrangement according to FIG. 5;

FIG. 8 is a schematic longitudinal view of a reactor according to the invention;

FIG. 9 is a schematic longitudinal view of the reactor according to FIG. 1, in an obliquely set position;

FIG. 10 is a schematic longitudinal view of a further embodiment of a reactor according to the invention;

FIG. 11 is a schematic longitudinal detail view of a part of the reactor according to FIG. 10, comprising the filter plates;

FIG. 12 is a schematic sectional longitudinal view of an additional embodiment of a reactor;

DETAILED DESCRIPTION OF THE INVENTION

Figure 7:
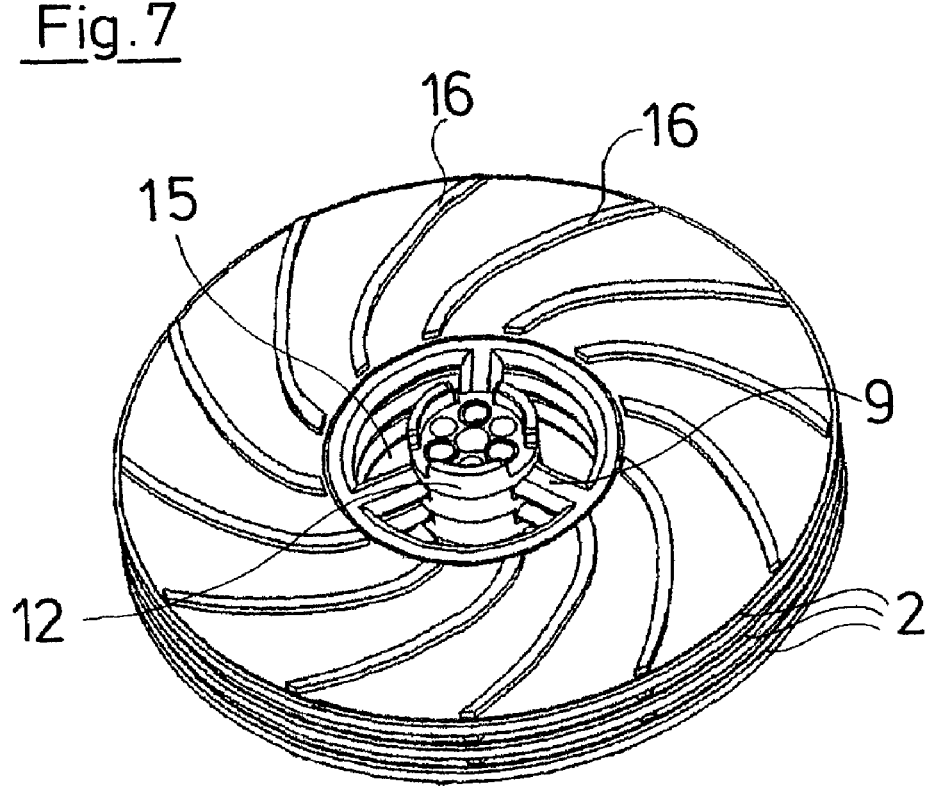
FIG. 7 is a schematic perspective top view of three filter plates arranged into a stack, with blades on a plate side.

The reactors represented by way of example in the FIGS. 8 to 15 in each case comprise a filter plate stack 1 which is formed of a multitude of filter plates which are arranged concentrically to one another and are placed onto one another into a stack, whose construction is to be deduced in detail from the FIGS. 1 to 4.

Each filter plate 2 comprises a central component 3, which for example may be designed as an injection moulded part of plastic, and which represents the carrying and channel-forming function of the filter plate 2. The actual filter is formed by two annular filter disks 4 which are arranged on the central component 3 on both sides, and together with this, form the filter plate 2. The central component 3 has a circular shape in a plan view (FIG. 4) and comprises a closed outer ring 5 on its outer periphery, whose outer side also forms the outer side of the filter plate 2. An inner ring 6 is arranged at a radial distance within the outer ring 5 and is connected to the outer ring 5 via three support ribs 7 arranged distributed at 120° intervals. Three conductively leading ribs 8 are arranged in each case offset by 60° to the support ribs 7, and in the same manner as the support ribs, comprise recesses 9 on the sides directed to the filter disks 4, and these recesses ensure the fluid circulation within the central component 3 which is covered on both sides by the filter disks 4. A free space is formed by these recesses 9, between the annular filter disks 4 and the central component 3, on whose ribs 7, 8 as well as rings 5, 6, the filter disks 4 are rested and supported on both sides.

Channels 10 are arranged within the conductively leading ribs 8 and run out within the filter plate 2 at different radii. The channel run-outs are designated as 11.

The conductively leading ribs 8 not only connect the outer ring 5 to the inner ring 6, but also to a central, essentially cylindrical connection component 12 with which the ribs 8 are firmly connected on the end side, and into which the channels 10 run out. The connection component 12 on the outside has a design which is stepped in a cylindrical manner and comprises catches 13, so that connection components 12 of adjacent filter plates 2 are stuck into one another in a manner such that the catches 13 in the region between adjacent conductively leading ribs 8 come to bear with a positive fit and in a tight manner. On account of these catches 13 in combination with the ribs 8, the filter plates 2 which are connected to one another in this manner, are connected to one another in a rotationally fixed manner, so that a torque is transmitted for rotation of the filter stack from one to the other plate 2, without a shaft being necessary for this. Thus the connection components 12 form a shaft, which is designed such that they are also fluid-tight to the outside.

In the simplest design, the connection components 12 are designed as stepped hollow cylinders, and a central channel envisaged for the discharge of filtrate is formed in a hollow shaft formed from this. In the previously described embodiment variant, however, a total of seven channels 14 are provided in the connection component 12, of which three are arranged in the region of the conductively leading ribs 8 which run out there and thus form a separate channel 14 for each of these ribs 8, in a manner such that with a filter plate stack 1 constructed accordingly of a multitude of filter plates 2, these three channels are assigned to a different radial level with respect to the rotation axis of the filter plates. Filtrate may be withdrawn via these channels and an additional substance, in particular air, may be introduced into the filter plates at a predefined radial level, via at least one of the channels. The channels 14 which are formed in this manner within the connection components 12, are sealed to the outside as well as with respect to one another, so that they form conduits which are separated from one another, which at the end of the filter plate stack are connected via a corresponding co-rotating (not represented) closure component.

An annular opening 15 through which the conductively leading ribs 8 pass, is formed in the filter plate 2 in the region between the inner ring 6 and the closure component 12.

In the assembled condition, a filter plate 2 is formed by a central component 3 on which filter disks 4 are attached on both sides and which cover the annular space between the inner ring 6 and the outer ring 5 to the outside. Filter plates 2 formed in such a manner are inserted into one another via their connection components 12, into a filter plate stack, as this is evident by way of FIG. 5. Thereby, the connection component 12 is designed such that the catches 13 have an inner periphery, which corresponds roughly to the outer periphery of the connection component 12 in the region of the ribs 8, so that connection components 2 may be stuck into one another, by which means the actual filter plates are arranged parallel to one another at a distance, and conduits are formed by the connection components via the channels 14, which are then aligned with one another, and these conduits are sealed from one another and from the opening 15. A filter plate stack formed in such a manner is driven in rotation within the reactor, wherein the fluid is supplied via the openings 15 and then moves radially outwards between oppositely lying filter disks 4 of adjacent filter plates 2. In this way, the filter disks 4 are subjected to the fluid to be filtered in a surfaced manner and under pressure, and this fluid at least partly penetrates the filter disks 4, and gets into the inside of the filter plates 2 as a filtered fluid, i.e., as a filtrate. The fluid located in the inside of the filter plates 2 is led via channel run-outs 11 to the connection component 12 and from there through the conduits formed by the channels 14, centrally out of the filter plate stack 1, and then led out of the reactor. The mass which remains between the filter plates 2 and does not pass the filter disks 4, is led back into the reactor with the delivery flow which is sucked through the openings 15 and led radially outwards.

This pump effect may be increased by attaching blades 16 on the filter plates 2 on one side, which, as is usual with centrifugal pump impellers, extend from the inner ring 6 to the outer ring 5 and thereby have a radial/tangential course, as is shown by way of example in FIG. 7. The blades 16 have a constant blade width and extend perpendicularly from the flat side of the filter disks 4. They may be formed such that the blades 16 of one filter plate 2 bear on the adjacent filter plate in the filter plate stack, so that quasi closed impellers are formed, which on rotation produce a good pump effect, which not only supports the circulation of the fluid within the filter device, but also the filter efficiency, since an increased pressure arises close to the outer periphery of the filter plates 2, which forces the filter procedure.

The previously described filter plate stack 1 is arranged within the reactor. The reactor itself has an essentially cylindrical reactor housing, which is formed of a tube section 18 and two covers 19 and 20, which are fastened therein on an end side, engage into the tube section and project beyond this on the end-side. The tube section 18 is formed by an extruded plastic tube, whereas the covers 19 and 20 are typically designed as metal parts machined in a material-removing manner, which comprise all connections/openings into the housing.

The schematically represented filter plate stack 1 is arranged on the end of the left side of the represented reactors. Thereby, the diameter of the filter plates 2 with respect to the inner diameter of the housing, and thus, of the tube section 18, is dimensioned such that the cross-sectional area of the tube section 18 in this region is only about 20% larger than the cross-sectional area of the filter plate stack, in order to achieve an intensive pump effect. As the schematic representations of the reactor according to FIGS. 8 and 9 make clear, the length 1 of the reactor housing is a multiple larger than the height h of the filter plate stack 1. The filter plate stack 1 is driven by a hollow shaft 21 which is led through the cover 19 on the left side and which is rotatable via a gear by way of a drive motor 22, which is fastened on the cover 19 and is arranged such that it is arranged next to the tube section 18. The filtrate is withdrawn from the reactor via the hollow shaft 21. Moreover, a connection to one of the channels 10 is provided, which are conductively connected to a ventilation device which is not shown in detail here, via which air is led to the reactor which exits over the filter plates in a finely distributed manner.

Figure 14:
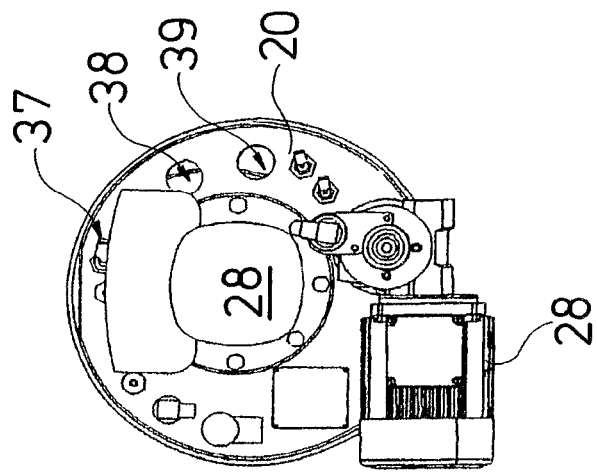
FIG. 14 is a schematic end view of the reactor in the direction of the arrow XIV in FIG. 13.
Figure 15:
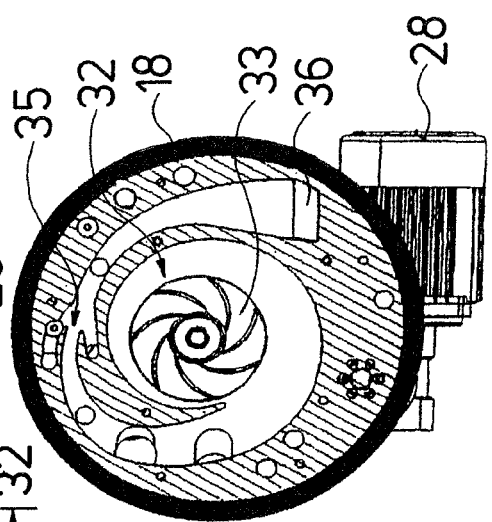
FIG. 15 is a schematic cross-sectional view along the line XV-XV in FIG. 13.

Within the reactor, the filter plate stack is covered axially by a suction tube 23, which engages over the inner ring 6 of the filter plate 2 which is arranged the furthest within the reactor housing. The suction port of the filter plate stack 1 is displaced further inwards into the reactor housing by way of this suction tube 23. With the embodiment represented by way of FIGS. 8 and 9, the suction tube 23 has a length which corresponds to roughly triple the height h of the filter plate stack 1. With the variants represented by way of FIGS. 10 to 12, the suction tube 23a has a significantly greater length and ends at a distance aligned with the filter plate stack 1. A biofilm reactor connects thereto at a distance in all embodiment variants, and this consists of two disk stacks 24 and 25 which are arranged axially behind one another at a distance, and this reactor is arranged coaxially in the cylindrical housing at a distance to the suction tube 23 as well as to the cover 20 which is on the right side in the Figs. The disk stacks 24 and 25 are driven in a rotatable manner and are fastened via a holder 26 at a distance within the cover, and are connected in drive. The construction of the disk stacks 24 and 25, their mounting on the holder 26 as well as their drive via the shaft 27, is known in detail from European Patent Application Publication No. EP 1 616 621 A1, which is expressly referred to in this context. The functioning principle corresponds to that described by way of FIGS. 3 to 6 in the previously mentioned document. The shaft 27 is led through the cover 20 which is on the right side in FIGS. 8 and 10, and there it is connected via a gear to a drive motor 28 (FIGS. 14, 15).

The represented reactors in the axial direction, consecutively comprise a biofilm reactor as well as a mechanical filter in the form of a filter plate stack 1. Thereby, the rotation of the filter plate stack 1 ensures a pump effect within the reactor housing, which produces an intensive throughflow of the complete housing. Fluid, in particular from the region between the disk stacks 24 and 25 and the holder 26, is sucked via the inner end of the suction tube 23, goes through the filter plate stack 1, there is delivered radially to the outside, and then flows along the inner side of the tube section 18 to the other end, thus in the direction of the cover 20, where it flows radially from the outside again to the inside into the disk stacks 24 and 25. Thereby, the filtrate is withdrawn via a hollow shaft 21 out of the filter plate stack 1, and air is simultaneously blown in over the filter plate stack 1 via at least one of the channels 10, which, with the reactor set obliquely in FIG. 9, travels through the reactor housing from below, thus from the left-side cover 19, slowly to the top to the right-side cover 20, and then collects there in the upper part of the housing in the form of an air bubble 29 and is withdrawn again via a filling level regulation which is not represented in detail.

The reactor according to FIG. 9 is set obliquely with its longitudinal axis at about an angle a with respect to the horizontal, which with the shown design is 6°.

While not shown in detail, the filter plates 2 of the filter plate stack may be provided with an electrically conductive layer which is led out through the cover 19 in an electrically insulated manner via a lead connection, and there, it may be subjected to a potential, so that, additionally, a physical, in particular electrical treatment of the fluid, may be effected in this region of the device. Thereby, one may apply a voltage between adjacent filter plates 2 or also between the contact surfaces of the filter plate stack 1 and one or both of the covers 19 and 20. As the case may be, an electrode may also be provided within the tube section 18 on the wall side.

With the reactors represented by FIGS. 8 to 10, the disk stacks 24 and 25 are rotatably driven by a drive motor 28 and a gear which is connected thereto, which are arranged on the outside on the cover 20 and are led into the inside of the reactor via the shaft 27. Alternatively, the biofilm reactors, in particular the disk stacks 24 and 25, may be driven via the drive which drives the filter plate stack 1. This is schematically represented by way of FIG. 12. There, the free end of the hollow shaft carrying the filter plates 2 and which lies within the reactor, is led into a gear 30, whose driven shaft 31 reaches up to the disk stacks 24, 25 and drives these. Since the disk stack 24, 25 are driven at a rotational speed which is significantly smaller in comparison to the filter plate stack, the gear 30 is designed as a stepping-down gear. With this arrangement, the cover 20 on the right side remains free of drive means for the biofilm reactor.

Figure 13:
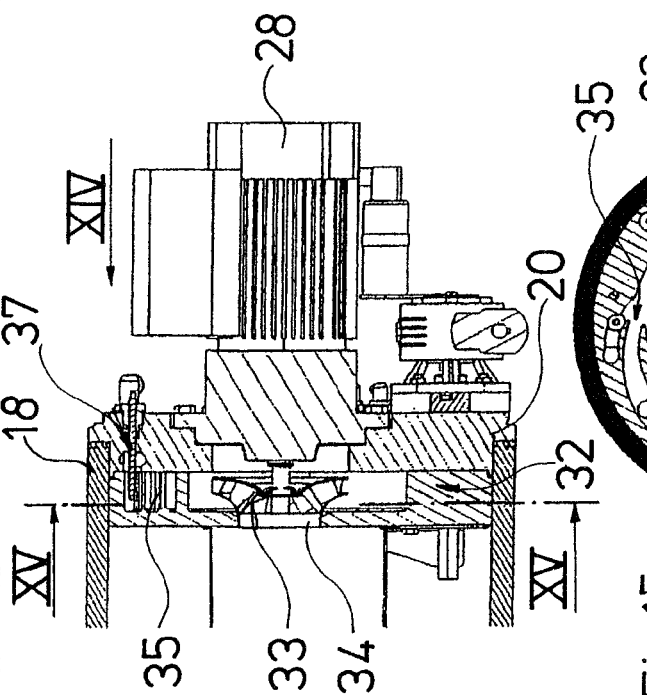
FIG. 13 is a schematic sectional longitudinal view of the end of the reactor on the biofilm reactor side.

If a separate ventilation is necessary for the biofilm reactor, then the cover 20, as is represented by way of FIGS. 13 to 15, may be provided on its inner side with an ejector pump 32, whose suction port runs out centrally within the reactor and which sucks air through a ventilation opening which is secured by a return valve, the air being entrained by the delivered fluid flow in the manner of an ejector and flowing into the reactor in the region of the outer periphery. The construction of this ejector pump 32 is visible in detail in FIGS. 13 to 15. The pump impeller 33 immerses into the suction opening 34 on the pump housing side. The pump worm which connects radially to the pump impeller 33 is constructed in an ejector-like manner and draws air in the ejector region 35, which is carried along in a finely distributed manner with the fluid, and then exits close to the outer periphery within the reactor in the region of the opening 36. The pump impeller is driven by a drive motor 28 arranged outside of the cover 20.

As may be seen in FIG. 13, a fluid sensor 37 is arranged in the upper region of the cover 20, and this sensor is a part of the filling level regulation, via which the air bubble 29 located in the reactor, is kept at an essentially constant volume.

Moreover, connections 38 and 39 are provided in the cover 20, which form the outer-side part of corresponding throughbores and which form the feed and discharge openings for the fluid within the reactor.

Figure 16:
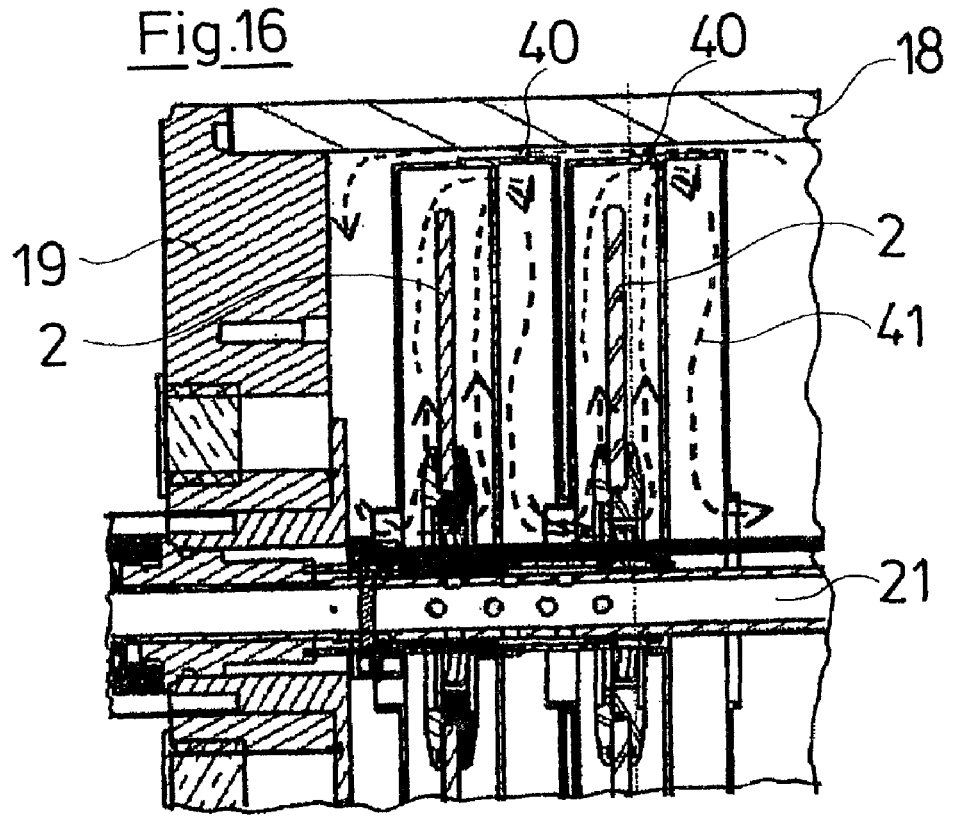
FIG. 16 is a schematic detail view of filters arranged in series.

It is shown, in FIG. 16, by way of example, a filter plate stack designed by suitable guidance devices such that the filter plates lie in series, and are thus subjected to peripheral flow in a consecutive manner. The guidance device 40 which is provided for this, surrounds the filter plate 2 which is shown on the left side in FIG. 16, in a manner such that only an annular opening remains on the left side in the region of the suction port, and otherwise an opening is formed on the right side, close to the upper outer periphery of the filter plate 2. The fluid which is sucked by the pump effect of the filter plate 2, is thus led radially to the outside along the filter plate, where it then is deflected by 180° on the right side in FIG. 16 close to the outer periphery and then in turn is led radially inwards, where again an annular opening to the second filter plate 2 connecting thereto on the right side is formed. The guidance devices 40 thus in each case form a housing which comprises two cylindrical spaces which are designed in an essentially closed manner, which lie behind one another in the axis direction and which at the end-sides in each case comprise a central opening and whose wall separating the cylindrical spaces is broken through close to the outer periphery for forming an annular gap. Such a guidance device together with the filter plate 2 rotating therein forms a type of pump stage. Thus, on account of the forced guidance within the guidance device 40, the pump effect of a multi-stage pump thus arises, i.e., the exit pressure of the pressure produced by the filter plate 2 which is on the left side in FIG. 16, prevails at the entry of the guidance device 40 which is on the right side, and this pressure is subsequently increased by the filter plate 2 which is on the right side in FIG. 16, in combination with the guidance device 40 which is assigned to this. One may transport away tough filter masses by way of such an arrangement. The through-flow of the filter plate stack caused by this is represented by the interrupted line 41. With this embodiment too, the filtrate, which is the fluid purified of suspended substances, is discharged through the inside of the filter plates 2 and the hollow shaft 21. Since the pressure difference with respect to the surroundings is increased with each filter stage, in particular with respect to the pressure prevailing in the hollow shaft 21, the filter effect from stage to stage also becomes greater, i.e., filtrate which was not withdrawn in the stages lying beforehand due to a lower pressure difference, is withdrawn in filter stages with a greater pressure. It is to be understood that only the basic construction of such an arrangement is represented by FIG. 16, but that basically a multitude of such pump stages formed of filter plates 2 and guidance device 40 may be arranged one after the other.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A reactor comprising a reactor housing (18, 19, 20), a filter plate stack (1) configured to be rotatably driven in said reactor housing, and a ventilation device, the filter plate stack (1) comprising at least one stack of hollow filter plates (2), a fluid to be filtered flowing into an interior of the filter plates (2), wherein a cross-sectional area of the reactor housing, at least in a region corresponding to the filter plate stack (1), exceeds a cross-sectional area of the filter plate stack (1) by at most 40%, and a length of a longitudinal extension (l) of the reactor housing (18, 19, 20) is at least twice a length of a longitudinal extension (h) of the filter plate stack (1), wherein the reactor is configured such that a discharge of the ventilation device occurs through the filter plate stack (1).

2. A reactor comprising a reactor housing (18, 19, 20), a filter plate stack (1) configured to be rotatably driven in said reactor housing, and a ventilation device, the filter plate stack (1) comprising at least one stack of hollow filter plates (2), a fluid to be filtered flowing into an interior of the filter plates (2), wherein a cross-sectional area of the reactor housing, at least in a region corresponding to the filter plate stack (1), exceeds a cross-sectional area of the filter plate stack (1) by at most 40%, and a length of a longitudinal extension (l) of the reactor housing (18, 19, 20) is at least twice a length of a longitudinal extension (h) of the filter plate stack (1), wherein the reactor is configured such that a discharge of the ventilation device is within the reactor housing (18, 19, 20) in a region distant from the filter plate stack (1).

3. A reactor comprising a reactor housing (18, 19, 20), a filter plate stack (1) configured to be rotatably driven in said reactor housing, and a ventilation device, the filter plate stack (1) comprising at least one stack of hollow filter plates (2), a fluid to be filtered flowing into an interior of the filter plates (2), wherein a cross-sectional area of the reactor housing, at least in a region corresponding to the filter plate stack (1), exceeds a cross-sectional area of the filter plate stack (1) by at most 40%, and a length of a longitudinal extension (l) of the reactor housing (18, 19, 20) is at least twice a length of a longitudinal extension (h) of the filter plate stack (1), wherein the ventilation device is configured such that a ventilation comprises an internal circulation within the housing (18, 19, 20).

4. The reactor according to claim 1, wherein the reactor is configured such that a rotation axis of the filter plate stack (1) and the longitudinal axis of the reactor housing (18, 19, 20) are arranged in parallel.

5. The reactor according to claim 3, wherein the filter plate stack (1) is attached in an end region of the reactor housing (18, 19, 20).

6. The reactor according to claim 2, further comprising fluid treatment devices (24, 25) within the reactor housing (18, 19, 20).

7. The reactor according to claim 6, wherein the filter plate stack (1) and the fluid treatment devices (24, 25) are arranged in series in the reactor.

8. The reactor according to claim 1, further comprising at least one biofilm reactor (24, 25) arranged within the reactor housing (18, 19, 20).

9. The reactor according to claim 8, wherein the reactor is configured such that the biofilm reactor (24, 25) can he driven in a rotatable manner and such that the biofilm reactor is driven via the filter plate stack (1).

10. The reactor according to claim 8, further comprising a drive (28) for the biofilm reactor (24, 25), wherein the drive (28) is arranged on an outer side of the reactor housing (18, 19, 20).

11. The reactor according to claim 8, further comprising a drive (28) for the biofilm reactor, wherein the drive (28) is arranged on an end of the reactor which is distant from the filter plate stack (1).

12. The reactor according to claim 3, wherein the reactor housing (18, 19, 20) is arranged in an inclined manner such that a longitudinal axis of the reactor housing defines an inclination angle with respect to a horizontal direction.

13. The reactor according to claim 2, wherein the reactor is configured such that the filter plate stack (1) can be driven at a peripheral speed of more than 3 m/s.

14. The reactor according to claim 2, wherein the reactor is configured to include a filling level regulator to maintain a fluid filling level of the reactor to a predefined value, and wherein the reactor housing comprises plastic.

15. The reactor according to claim 3, further comprising conduit connections for fluid feed and fluid discharge, the conduit connections being arranged at an end portion of the reactor housing.

16. The reactor according to claim 3, further comprising a suction tube (23) arranged at an end of the filter plate stack (1), the suction tube comprising a suction opening arranged at a distance from the filter plate stack (1), the distance being at least double the longitudinal extension (h) of the filter plate stack (1).

17. The reactor according to claim 4, wherein the reactor is configured such that the rotation axis of the filter plate stack (1) and the longitudinal axis of the reactor housing (18, 19, 20) are spaced from one another.

\* \* \* \* \*